United States Patent [19]

Kramer

[11] Patent Number: 4,464,843

[45] Date of Patent: Aug. 14, 1984

[54] ANGULAR MEASUREMENT APPARATUS WITH REFERENCING SYSTEM

[75] Inventor: Melvin G. Kramer, Riverton, Wyo.

[73] Assignee: The Brunton Company, Riverton, Wyo.

[21] Appl. No.: 444,670

[22] Filed: Nov. 26, 1982

[51] Int. Cl.³ .......................................... G01C 17/26
[52] U.S. Cl. .................................. 33/363 K; 33/356
[58] Field of Search ............... 33/363 K, 363 R, 361, 33/360, 356, 358, 355 R; 340/347 P

[56] References Cited

U.S. PATENT DOCUMENTS

| | | | |
|---|---|---|---|
| 2,411,866 | 12/1946 | Braddon | 33/356 |
| 3,133,244 | 5/1964 | Wojtulewicz | 33/356 |
| 3,187,187 | 6/1965 | Wingate | 250/233 |
| 3,244,895 | 4/1966 | Anderegg, Jr. | 250/236 |
| 3,560,959 | 2/1971 | Bergey | 340/347 |
| 3,713,139 | 1/1973 | Sanford et al. | 340/347 |
| 3,728,715 | 4/1973 | Shapiro | 340/347 |
| 3,824,587 | 7/1974 | Fowler | 340/347 |
| 4,006,631 | 2/1977 | Garner | 33/356 |
| 4,095,348 | 6/1978 | Kramer | 33/363 K |
| 4,101,882 | 7/1978 | Kramer | 340/347 P |
| 4,154,000 | 5/1979 | Kramer | 33/366 |
| 4,262,427 | 4/1981 | Lynch et al. | 33/356 |

FOREIGN PATENT DOCUMENTS 2929504 1/1980 Fed. Rep. of Germany ........ 33/361

OTHER PUBLICATIONS

"A Magnetic Compass with Cathode-Ray Sensing Element," by Kliever, et al.; AIEE Transactions 1947, vol. 66, pp. 529-534.

Primary Examiner—Willis Little
Attorney, Agent, or Firm—John E. Reilly

[57] ABSTRACT

A pair of referencing coils are mounted in direct association with a rotatable scale having a reference position index and a code strip. A reference position sensor generates a signal in response to alignment of the reference position sensor with the reference position index, and magnetic members are operative to normally align the scale with magnetic north. An electrical drive is provided for alternately energizing the reference coils disposed at predetermined angles to one another and to the magnetic members which respond to the energization of each coil and advance the reference position index toward the reference position sensor. Preferably alignment coils are positioned at equal angles to either side of the reference position sensor so that drive requirements are such that the current applied to each coil is only necessary to draw the magnets and associated scale through an angle which is just greater than one-half the total included angle between the coils.

11 Claims, 5 Drawing Figures

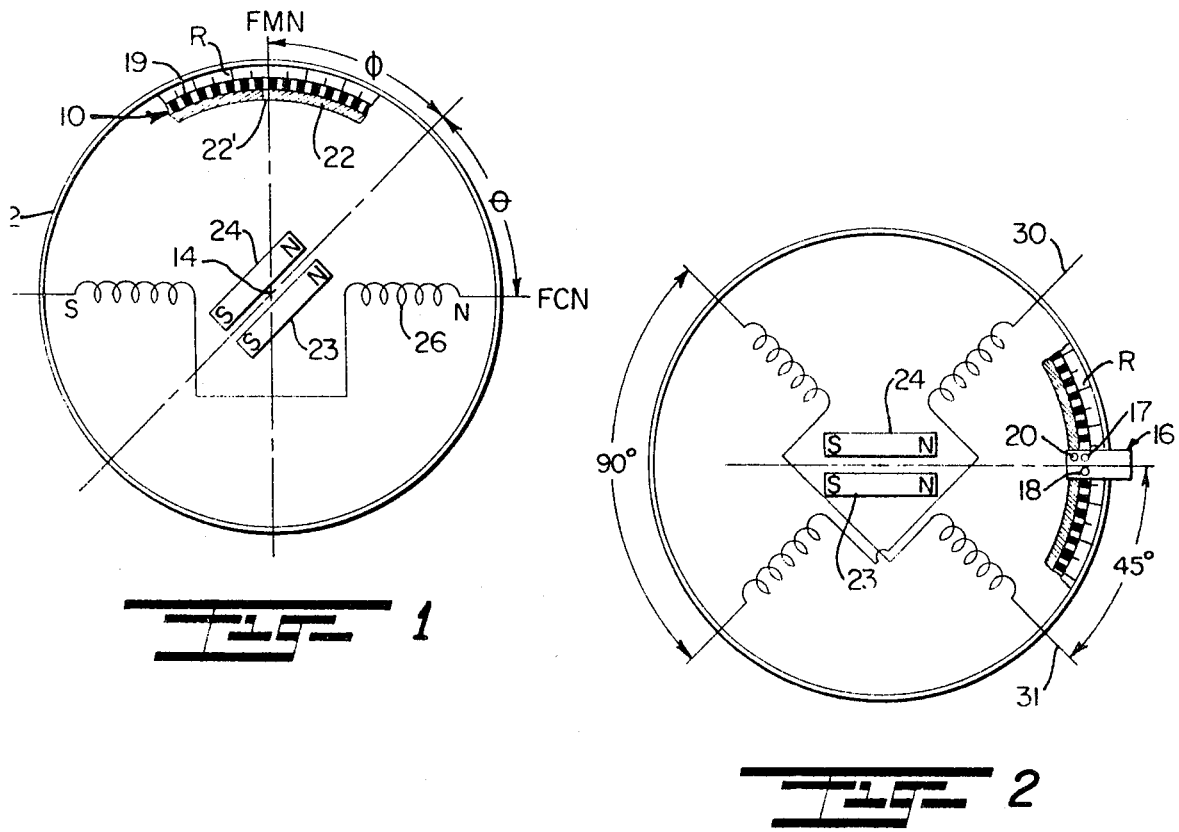
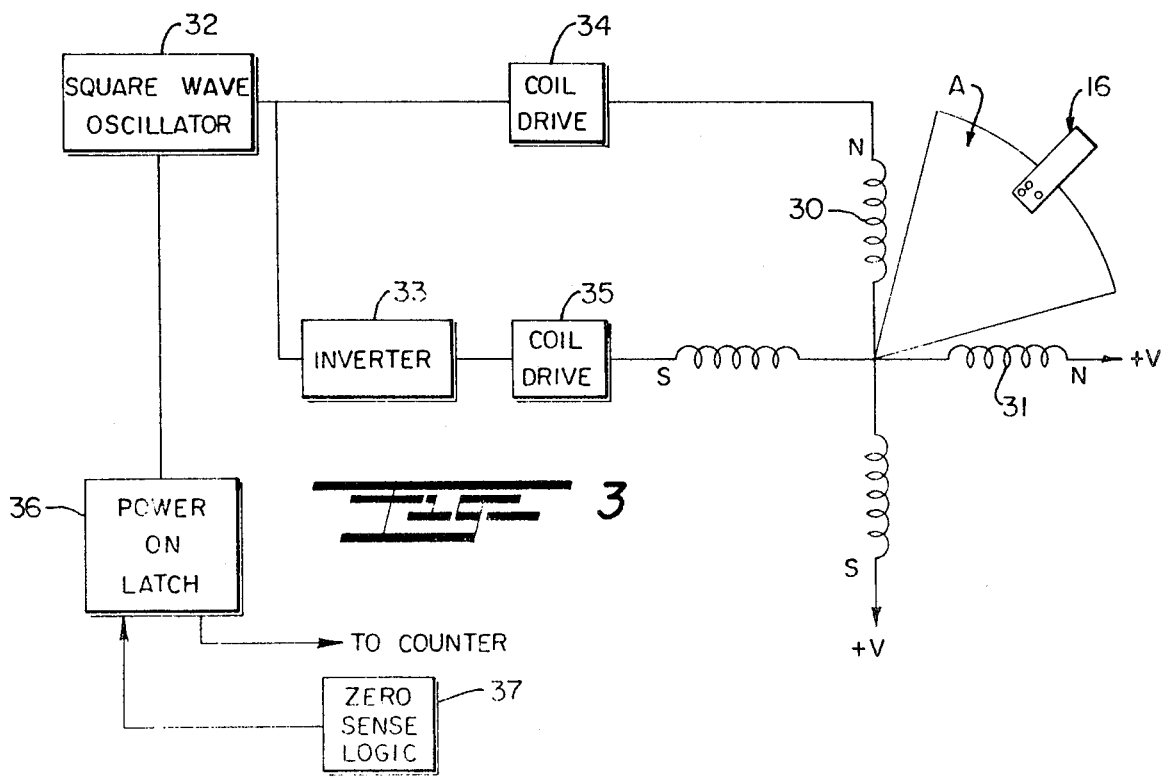

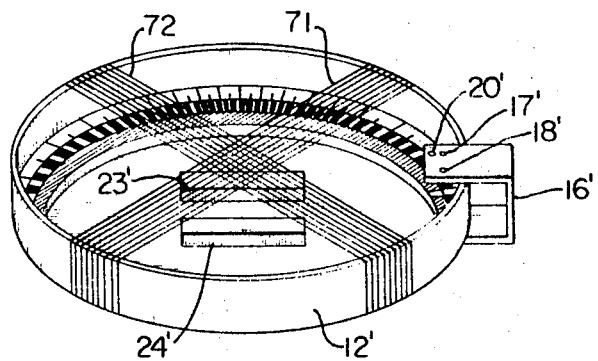
_FIG. 4_
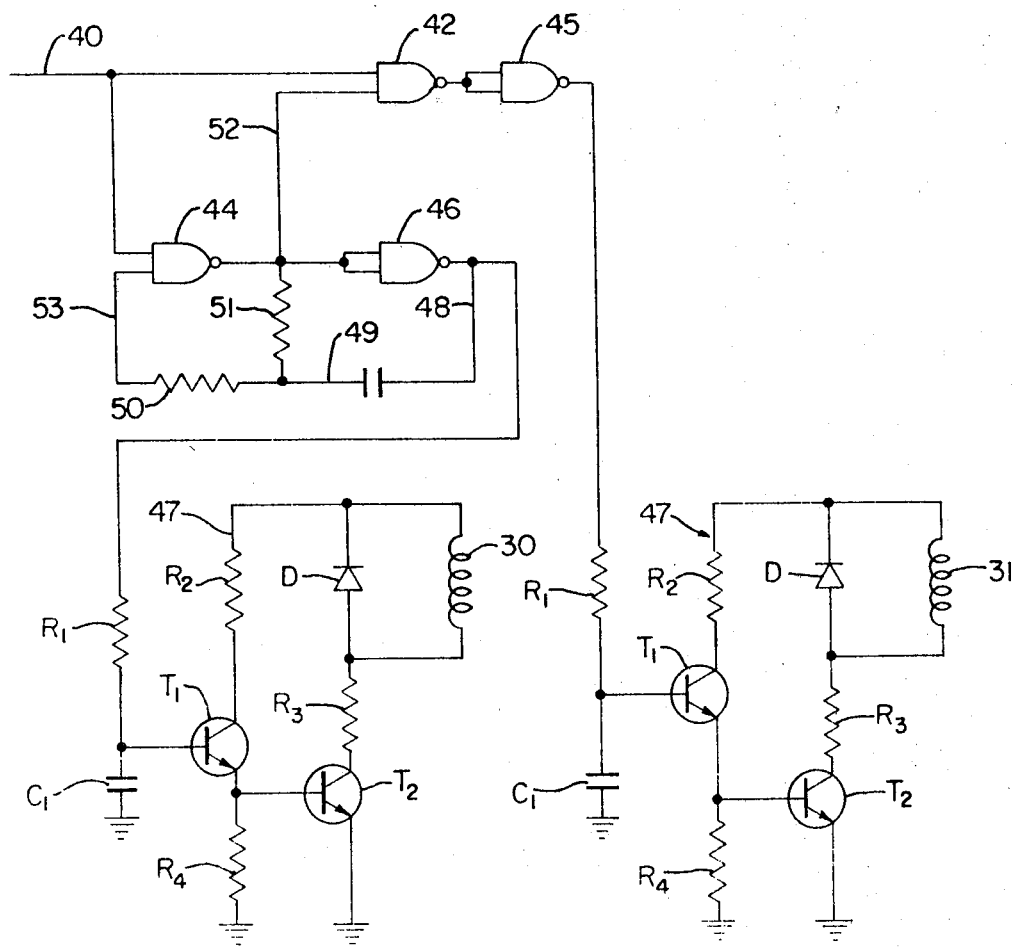
_FIG. 5_

ANGULAR MEASUREMENT APPARATUS WITH REFERENCING SYSTEM

This invention relates to angular measurement devices and more particularly relates to digital compasses employing circular scales adaptable for measuring angular displacement with respect to the earth's magnetic field.

BACKGROUND AND FIELD OF THE INVENTION

The reference system of the present invention may be best exemplified by describing its use in connection with digital compasses, such as for example, that disclosed in my U.S. Pat. No. 4,095,348 for Digital Compass. In the compass disclosed in that patent, a digit code disc is rotatable under the influence of magnets, and a code strip on the disk is divided into increments representing the least significant angle position movements of the compass from zero to 360°. An additional channel or track is provided for determination of the zero or reference point on the disc; and when the reference position is sensed a counting circuit is set to zero. This is done by energizing a single set of in-line reference coils when the power is initially turned on so as to cause the magnets to overcome the earth's magnetic field and advance the reference position into alignment with the "zero" or reference setting on the body of the compass housing. When the disc reaches the reference setting, a signal clears the counting circuit to cause it to read "zero" and simultaneously deenergizes the reference coils, at which time the disc is immediately responsive to the particular compass direction to be measured. Angular displacement of the disc is sensed by a pair of spaced sensors disposed an odd number of increments apart and which in the manner described in detail in the above referenced patent will generate signals which are sensed, stored and counted. One difficulty encountered in that invention as disclosed is that utilization of a single set of in-line reference coils to advance the magnets into the reference position requires a great deal of force or electrical energy and in many applications, such as, in autopilot systems has been found to be inefficient in actual use. It is therefore an aim of this invention to provide for greater efficiency in sensing the reference position in a compass or other angular measuring apparatus when the power is turned on and to minimize the power or drive requirements in advancing the compass scale to its reference position as a preliminary to measuring displacement.

SUMMARY OF THE INVENTION

In accordance with the present invention, a pair of referencing coils are mounted in direct association with a rotatable scale having a reference position index and a code strip. A reference position sensor generates a signal in response to alignment of the reference position sensor with the reference position index, and magnetic members are operative to normally align the scale with magnetic north. Electrical drive means are provided for alternately energizing the reference coils which are disposed at predetermined angles with respect to one another and to the magnetic members. The magnetic members respond to the energization of each coil to advance the reference position index toward the reference position sensor, and means associated with the electrical drive means is inhibited in response to the reference position index becoming aligned with the reference position sensor whereupon the scale is then free to align itself with the earth's magnetic field under the influence of the magnetic members. Preferably the alignment coils are positioned at equal angles to either side of the reference position sensor, and the drive requirements are then such that the current applied to each coil is only that necessary to draw the magnets and associated scale through an angle which is just greater than one-half the total included angle between the coils. This obviates the necessity of advancing the magnets and associated scale into substantial alignment with the axis of a single alignment coil as was the case in my above referenced U.S. Pat. No. 4,095,348.

It is therefore an object of the present invention to provide for a novel and improved displacement measuring apparatus which is efficient and highly simplified in construction as well as being reliable in use.

Another object of the present invention is to provide for a novel and improved method and means for aligning a scale on a compass to a reference position as a preliminary to taking measurements; and more specifically wherein the alignment method and means are readily conformable for use with various types of compasses and other angular displacement measuring apparatus.

It is a further object of the present invention to provide for electrically driven reference coils for aligning the scale on a digital compass with a predetermined reference position as a preliminary to reading of a compass direction.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a somewhat diagrammatic view of a conventional form of referencing coil for a digital compass;

FIG. 2 is a diagrammatic view of a preferred form of referencing coil system in accordance with the present invention;

FIG. 3 is a flow diagram of a drive circuit for the preferred form of referencing coil system of the present invention;

FIG. 4 is a somewhat perspective view illustrating the preferred mounting of the referencing coils on a fluid-filled vial in a conventional form of compass; and FIG. 5 is a circuit diagram of the drive circuit illustrated in FIG. 3.

DETAILED DESCRIPTION OF THE PREFERRED EMBODIMENT

Referring to the drawings, and as a setting for the present invention, FIG. 1 schematically illustrates a conventional form of referencing system, for example, that of the type set forth and described in detail in my hereinbefore referred to U.S. Pat. No. 4,095,348. As illustrated in FIGS. 1 and 2, a rotatable disc generally represented at 10 is mounted for rotation within a housing 12 about a center pivot or axis 14. A sensor plate 16 is affixed to the housing and includes a pair of circumferentially spaced sensors 17 and 18 aligned with an outer code strip 19 on the disc 10, and an inner sensor 20 which is aligned with a reference position strip 22 on the disc, the strip 22 being disposed in inner concentric relation to the outer code strip 19. A pair of permanent magnets 23 and 24 are secured on the disc 10 in closely spaced parallel relation to one another on opposite sides of the pivot point 14, the magnets typically being elongated bar magnets having their north-seeking and south-seeking poles N and S, respectively, aligned in the same direction. An alignment or reference coil 26 extends diametrically across the housing, the coil 26 typically being fixed in the bottom wall of the housing so as to be mounted on an axis or center line passing through the center line of the fixed sensor plate 16.

Although not illustrated in FIG. 1, a power cord extends to the necessary logical circuitry provided to decode the sensor outputs received from the sensors. The outer code strip 19 is formed with alternate light and dark areas which for instance may be spaced 2° apart in relation to the degree readings on a fixed azimuth ring R, the latter conventionally provided with scale markings from zero to 360° around its periphery. The outer sensors 17 and 18 are photosensitive and will generate a signal as one of the light or transparent areas on the code strip 19 passes beneath the sensors 17 and 18. In that the sensors are disposed an odd number of increments or degrees apart, their signals are 90° out of phase so that by summing up the signals from the sensors 17 and 18 at any given point the direction of movement of the disc can be determined so as to cause the logical circuitry to count either up or down from its previous reference setting. The third sensor 20 is spaced radially inwardly of the sensor 17 for use in conjunction with a reference position index 22′, the latter defining a light or transparent area on the inner reference position strip 22 which is aligned with a light area on the code strip 19. In this relation the logical circuitry includes a drive circuit connected to the coil 26 so that when activated, current is applied to the coil to overpower the earth's magnetic field and to cause the magnets 23 and 24 to align with the field of the coil 26 thereby causing the reference point or index 22′ on the disc to rotate and to become aligned with the sensor 20. When the reference point is reached, as sensed by the alignment of the sensors 17 and 20 simultaneously over the light areas on the concentric strips 19 and 22, the current in the reference coils is automatically removed and the disk is then free to rotate and align itself with the earth's magnetic field.

A difficulty inherent in the system shown in FIG. 1 is that, for instance, if the magnetic axis of the coils 26 is at 90° relative to magnetic north, when the coils are energized there are two forces acting on the magnets; namely the magnetic north force designated $F_{mn}$ and the coil north force designated $F_{cn}$. For the relative positions shown these forces are 90° apart, each producing a torque to align the magnets 23 and 24 in its respective direction. The torque produced by $F_{mn}$ is:

$$T_{mn} = (F_{mn}) 1 \cos \theta \tag{1}$$

where 1 is the effective magnet length. The torque produced by $F_{cn}$ is:

$$T_{cn} = F_{cn} 1 \cos \phi \tag{2}$$

Under the influence of these two torques, the magnets will rotate to a final position. By equating these two torques and solving for $\theta$, the final position with the coils energized is found to be:

$$\theta = \tan^{-1} F_{mn}/F_{cn} \tag{3}$$

If the coils are to be rotated to within 0.5° of the alignment coil axis, which is necessary with a 0.5° incremental compass, the force required to do this by solving the above equation for $F_{cn}$ is:

$$F_{cn} = F_{mn} 1/\tan \theta \tag{4}$$

With $\theta = 0.5°$ $F_{cn}$ is equal to 114 times $F_{mn}$. This shows that the force of the alignment coils must be 114 times stronger than the magnetic north force to achieve the 0.5° alignment for the position shown and therefore requires large coils and currents.

It can be appreciated that the forces required to rotate the magnets into alignment with the common magnetic axis of the coils must be substantially increased in order for the magnets to approach the alignment coil axis. However, it is possible to achieve a substantial reduction in the alignment coils force if the alignment coils need only be strong enough to draw the magnets to within 45° of the alignment coil axis. From equation (4) above, if $\theta$ equals 45°, $F_{cn}$ equals $F_{mn}$ to thereby reduce the force by a factor of 114.

FIG. 2 schematically illustrates a preferred referencing system, in accordance with the present invention, to substantially reduce the drive or power required to align the reference position index, with the sensor 20 and wherein like parts to those of FIG. 1 are correspondingly enumerated. Specifically, in place of the single alignment coil 26, two sets of in-line coils 30 and 31 are affixed in the bottom wall of the housing 12 at 90° to one another and are symmetrically arranged with respect to the sensor plate 16 so that the magnetic axis of each coil is arranged at 45° with respect to the sensor plate 16. In this manner, by using two sets of alignment coils 30 and 31 and positioning them at plus and minus 45° to each side of the plate 16, alternately energizing each coil 30, 31 will result in a rotational oscillation of the compass magnets 23, 24 between the two coils. The reference position index 22′ on the strip 22 is disposed in radially outwardly spaced relation to the magnets 23 and 24 and, in following the osillation of the magnets, will pass beneath the fixed sensor plate 16.

In the block diagram shown in FIG. 3, alternate energization of the coils 30 and 31 is effected through the utilization of a square wave oscillator 32, an inverter 33 and coil drivers 34 and 35 for the coils 30 and 31, respectively. Power is turned on through a "power on" latch 36 to cause the oscillator 32 to alternately deliver electrical drive signals to each of the coils in succession. At the same time, a clear signal is applied by the latch 36 to an up/down counter, not shown. The compass magnets 23 and 24 are then rotated back and forth in the search area represented at A until the reference or zero position is sensed by the simultaneous alignment of the reference position index 22′ and the light area on the code strip 19 with the sensors 20 and 17. When the zero position is sensed as represented at 37, the power on latch 36 is reset, the oscillator 32 is inhibited and the coil drive is terminated whereupon the compass magnets 23 and 24 will return to their magnetic north position. The incremental movements of the disc 10 away from the reference position in measuring a given angular displacement are then monitored by the compass logic circuitry as described in detail in my hereinbefore referred to U.S. Pat. No. 4,095,348 and incorporated by reference herein. Specifically as illustrated in FIG. 6 of U.S. Pat. No. 4,095,348 when the reference position is reached, the zero position logic circuit operates to sense the reference position by ANDING the signals sensed from sensors 20 and 17 so as to result in a Clear signal applied to the power on latch. The Clear signal is thereby released to the up/down counter and the reference coils current removed so that the circuit will then operate to count the increments moved away from the reference position to the compass logic circuitry.

FIG. 5 is a circuit diagram illustrating in more detail a preferred form of drive circuit for alternately energizing the coils 30 and 31 in a manner specifically intended for use in association with the logical circuitry described in my hereinbefore referred to patent. Here, an inhibit line 40 forms one of the inputs to NAND gates 42 and 44, the outputs of which are applied to inverters 45 and 46, respectively. The output of each inverter is connected to coil driver circuits 47 for each of the coils 30 and 31, respectively. An oscillator circuit, made up of a capacitor 49 and resistors 50 and 51, is connected to the other input side via lines 52 and 53 to each of the NAND gates 42 and 44 to control alternate energization of the coils and to interrupt current to both coils when the reference position is sensed. Each coil driver circuit 47 is corresponding comprised of current amplifying transistors $T_1$ and $T_2$; and a diode D serves to clamp the voltage when each respective coil is turned off. For the purpose of illustration and not limitation, transistors $T_1$ and $T_2$ may be 2N4124 and 2N4401 transistors, and the diode D is an IN4002 transistor. In the oscillator circuit, capacitor 49 is given a value of 1.2 $\mu f$, and resistors 50 and 51 are 640 and 680 ohms, respectively. In the coil drives, $R_1$, $R_2$, $R_3$ and $R_4$ are given values of 33K ohms, 1K ohms, 150 ohms and 10K ohms, respectively, and the capacitor $C_1$ coupled to ground has a value of 1 $\mu f$. The values given above are to establish an oscillation cycle on the order of 5 seconds for alternate energization of each coil. Again, when the position is sensed, the oscillator is inhibited and the power turned off to the coils whereupon the magnets are free to advance in response to the earth's field in measuring displacement.

Detailed Description of an Alternate Embodiment of the Present Invention

There is illustrated in FIG. 4 an alternate form of referencing system wherein the housing 12' takes the form of a fluid-filled vial containing the same elements as described in detail with respect to the housing 10 illustrated in FIGS. 1 and 2. For the purpose of clarity, only the magnets 23' and 24' are illustrated in FIG. 4 and which are disposed in the same relationship to one another and to the outer code strip and reference position channel or track as described with reference to FIGS. 1 and 2. Again, a fixed sensor plate 16' is affixed to the vial 12' and is provided with circumferentially spaced sensors 17' and 18' aligned with an outer code strip, not shown, and an inner sensor 20' aligned with the reference position strip, not shown.

In this form, a pair of alignment coils 71 and 72 are wrapped at 90° to one another diametrically about the exterior of the housing 10' in a predetermined number of turns as dictated by the amount of force required for alignment of the magnets. It has been found that the number of windings or turns in each alignment coil 71, 72 can be reduced substantially for a given amount of alignment force required in oscillating the magnets in comparison to the number of windings required in the in-line coils 30 and 31 illustrated in FIG. 2. Also, particularly in the case of a fluid-filled vial, mounting of the coils by wrapping around the exterior of the vial simplifies assembly of the coils.

Although the optimum angle between the reference coils in the alternate forms of invention has been established at 90°, it will be evident that this angle can be reduced. Thus, as long as the sensor plate 16' containing the zero sensing optics is between the two coils, the area between the coils will be searched for the reference position. As the angle between coils is decreased, though, the force required by the coils will increase.

It is therefore to be understood that various modifications and changes may be made in the construction and arrangement of elements and their disposition with respect to one another without departing from the spirit and scope of the present invention as defined by the appended claims.

I claim:

1. In a compass wherein a rotatable scale has a reference position index and a code strip provided with indicia representing degrees of angular displacement away from said reference position index, a reference position sensor for generating a signal in response to alignment of said reference position sensor with said reference position index, and magnetic means operative to align said scale with magnetic north, the improvement comprising:

a pair of electrical referencing members disposed on opposite sides of said magnetic means and drive circuit means for alternately energizing said referencing members, said magnetic means responsive to alternate energization of each reference member to advance said reference position index across said reference position sensor, and means deenergizing said drive circuit means in response to said reference position index being advanced into alignment with said reference position sensor whereupon said scale is aligned by said magnetic means with the earth's magnetic field, said referencing members defined by electrical coils wrapped diametrically around the exterior of said housing and disposed at an included angle of substantially 90° with respect to one another, said coils having sufficient current supplied thereto by said drive means to rotate said magnetic means within 45° of the magnetic axis of each of said coils.

2. In a compass according to claim 1, including an outer stationary housing enclosing said scale, and said referencing members mounted in said housing.

3. In a compass according to claim 2, said coils intersecting one another at the center of said housing.

4. In a compass according to claim 1, said magnetic means defined by permanent bar magnets aligned in spaced parallel relation to one another on opposite sides of the axis of rotation of said rotatable scale.

5. In a compass according to claim 2, said drive circuit means including an oscillator and a coil driver circuit associated with each of said coils being alternately energized by said oscillator.

6. In a digital compass wherein a rotatable scale has a reference position index and a code strip provided with indicia representing degrees of angular displacement away from said reference position index, a fixed reference position sensor for generating a signal in response to alignment of said reference position sensor with said reference position index, and magnetic members rotatable with said scale to align said scale with magnetic north, the improvement comprising:

a pair of fixed electrical referencing coils disposed on opposite sides of said magnetic members, and drive circuit means for alternately energizing said reference coils, said reference coils positioned to extend radially at a predetermined angle to one another on opposite sides of said reference position sensor, and having sufficient current applied thereto by said drive circuit means to rotate said magnetic members through greater than one-half the included angle between said reference coils, said magnetic members responsive to alternate energization of said coils to advance said reference position index towards said reference position sensor, and means de-energizing said drive circuit means in response to said reference position index being aligned with said reference position sensor whereby said scale is aligned by said magnetic members with the earth's magnetic field.

7. In a compass according to claim 6, said rotatable scale disposed in an outer stationary housing, said reference coils being wrapped diametrically around the exterior of said housing and disposed at an included angle of 90° with respect to one another.

8. In a digital compass wherein an incremental encoder has a disc provided with a movable digit code strip formed with alternate light-transmitting areas representing degrees of incremental movement, a reference position index movable with said code strip has a light-transmitting area aligned with one of the light-transmitting areas of said digit code strip, and a fixed reference position sensor is operative to generate a signal in response to alignment of light-transmitting areas of said digit code strip and reference position index therewith, the combination comprising:

a magnetic member secured to said disc with its magnetic poles aligned with the aligned light-transmitting areas of said digit code strip and reference position index;

a pair of reference coils mounted on said encoder for extension of said coils in a radial direction such that an imaginary line through said magnetic member bisects the included angle between said reference coils; and drive circuit means for alternately energizing each of said coils to impart reciprocal movement to said magnetic member causing said aligned light-transmitting areas on the said reference position index and digit code strip to traverse said reference position sensor.

9. In a digital compass according to claim 8, said drive circuit means including means to inhibit said drive circuit in response to movement of said aligned light-transmitting areas across said reference position sensor.

10. In a digital compass according to claim 9, said incremental encoder including an outer housing mounted for rotation about a center axis, and said reference coils being wrapped diametrically about the external surface of said housing at an angle of 90° with respect to one another.

11. In a digital compass according to claim 10, said housing defined by a fluid-filled vial containing said code strip and reference position index therein, and said magnetic member defined by a pair of elongated permanent magnets disposed in closely spaced parallel relation to one another.

* * * * *

UNITED STATES PATENT AND TRADEMARK OFFICE
CERTIFICATE OF CORRECTION

PATENT NO. : 4,464,843

DATED : August 14, 1984

INVENTOR(S) : Melvin G. Kramer

It is certified that error appears in the above—identified patent and that said Letters Patent is hereby corrected as shown below:

Column 4, line 27, after "index" add -- 22' --.

Column 5, line 24, cancel "corresponding" and substitute -- correspondingly --.

Signed and Sealed this

Twenty-fifth Day of December 1984

[SEAL]

Attest:

Attesting Officer

GERALD J. MOSSINGHOFF

Commissioner of Patents and Trademarks